United States Patent
Hille

(10) Patent No.: US 12,217,746 B2
(45) Date of Patent: Feb. 4, 2025

(54) CONTROLLER FOR A MOBILE DRIVE, AND METHOD FOR CONTROLLING A MOBILE DRIVE

(71) Applicant: DewertOkin GmbH, Kirchlengern (DE)

(72) Inventor: Armin Hille, Bielefeld (DE)

(73) Assignee: Dewertokin Technology Group Co., Ltd, Jiaxing (CN)

( * ) Notice: Subject to any disclaimer, the term of this patent is extended or adjusted under 35 U.S.C. 154(b) by 590 days.

(21) Appl. No.: 17/046,666

(22) PCT Filed: Apr. 9, 2019

(86) PCT No.: PCT/EP2019/058995
§ 371 (c)(1),
(2) Date: Oct. 9, 2020

(87) PCT Pub. No.: WO2019/197424
PCT Pub. Date: Oct. 17, 2019

(65) Prior Publication Data
US 2021/0035580 A1  Feb. 4, 2021

(30) Foreign Application Priority Data
Apr. 13, 2018 (DE) ...................... 10 2018 108 867.1

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G08C 17/00* (2013.01); *G10L 15/08* (2013.01);
(Continued)

(58) Field of Classification Search
CPC ... G10L 15/22; G10L 15/26; G10L 2015/223; G10L 2015/088
See application file for complete search history.

(56) References Cited

U.S. PATENT DOCUMENTS 5,335,313 A * 8/1994 Douglas .................. G10L 15/26
704/E15.045
10,905,609 B2 * 2/2021 Childs .................... A61G 7/012
(Continued)

FOREIGN PATENT DOCUMENTS

CN 103617405 3/2014
CN 106465006 2/2017
(Continued)

OTHER PUBLICATIONS

International Search Report issued by the European Patent Office in International Application PCT/EP2019/058995 on May 13, 2019.
(Continued)

*Primary Examiner* — Mark Villena
(74) *Attorney, Agent, or Firm* — Henry M. Feiereisen LLC

(57) ABSTRACT

A controller for a furniture drive includes an operating device which includes a speech controller. The speech controller includes a speech control subunit operatively connected to an adjustment drive, and a microphone interacting with the speech control subunit. The speech controller includes three speech control subunits arranged in the operating unit, with two of the speech control subunits forming actuators of adjustment functions and one of the speech control units forming an actuator of stopping the adjustment drive.

19 Claims, 5 Drawing Sheets

(51) Int. Cl.
    *G08C 17/00*     (2006.01)
    *G10L 15/08*     (2006.01)
    *G10L 15/32*     (2013.01)
    *A47B 9/00*     (2006.01)
    *A47C 31/00*     (2006.01)
    *A61G 5/10*     (2006.01)
    *A61G 7/015*     (2006.01)
    *A61G 7/018*     (2006.01)

(52) U.S. Cl.
    CPC ............... *G10L 15/32* (2013.01); *A47B 9/00* (2013.01); *A47B 2200/006* (2013.01); *A47B 2200/0062* (2013.01); *A47C 31/008* (2013.01); *A61G 5/1056* (2013.01); *A61G 7/015* (2013.01); *A61G 7/018* (2013.01); *A61G 2203/18* (2013.01); *A61G 2203/70* (2013.01); *G08C 2201/31* (2013.01); *G10L 2015/088* (2013.01); *G10L 2015/223* (2013.01)

(56) References Cited

U.S. PATENT DOCUMENTS

| | | | | |
|---|---|---|---|---|
| 2004/0193420 A1* | 9/2004 | Kennewick | ......... | G06F 16/3329 704/270.1 |
| 2008/0147398 A1* | 6/2008 | Kagermeier | ........... | A61B 90/00 704/E15.001 |
| 2008/0172789 A1* | 7/2008 | Elliot | ................... | A61G 7/0527 5/616 |
| 2011/0115875 A1* | 5/2011 | Sadwick | ................. | H04N 7/15 348/14.08 |
| 2014/0165291 A1* | 6/2014 | Mccarty | ................. | A61H 23/02 5/658 |
| 2015/0351982 A1* | 12/2015 | Krenik | .................... | A47C 23/06 5/616 |
| 2017/0143565 A1* | 5/2017 | Childs | .................... | A61G 7/015 |
| 2017/0295949 A1 | 10/2017 | Sizer et al. | | |
| 2018/0199716 A1* | 7/2018 | Bertinato | ................ | A47C 7/72 |
| 2018/0366122 A1 | 12/2018 | Lee et al. | | |
| 2019/0216228 A1* | 7/2019 | Bertinato | ............... | G05B 15/02 |
| 2019/0265691 A1* | 8/2019 | Agrawal | ............. | G01G 19/445 |
| 2021/0035555 A1 | 2/2021 | Hille | | |

FOREIGN PATENT DOCUMENTS

| | | |
|---|---|---|
| CN | 107532964 | 1/2018 |
| DE | 43 15 210 | 11/1994 |
| DE | 203 14 217 | 2/2005 |
| DE | 102008051133 | 4/2010 |
| GB | 2471401 | 12/2010 |
| JP | H06-125942 | 5/1994 |
| WO | WO 2018/065142 | 4/2018 |
| WO | WO 2019/145440 A1 | 8/2019 |

OTHER PUBLICATIONS

German Search Report issued on Dec. 6, 2018 with respect to counterpart German patent application 10 2018 108 867.1.

Translation of German Search Report issued on Dec. 6, 2018 with respect to counterpart German patent application 10 2018 108 867.1.

* cited by examiner

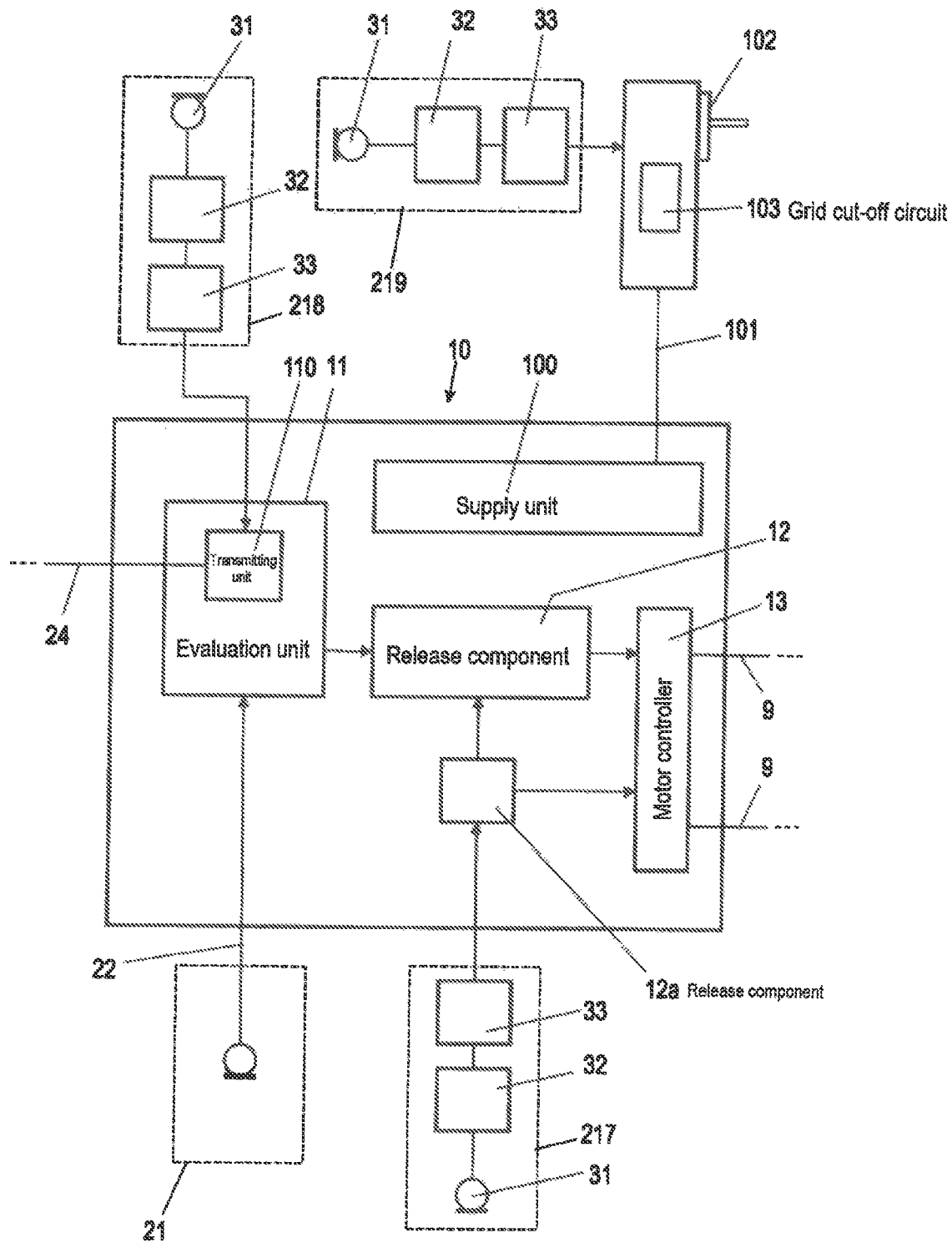

CONTROLLER FOR A MOBILE DRIVE, AND METHOD FOR CONTROLLING A MOBILE DRIVE

CROSS-REFERENCES TO RELATED APPLICATIONS

This application is the U.S. National Stage of International Application No. PCT/EP2019/058995, filed Apr. 9, 2019, which designated the United States and has been published as International Publication No. WO 2019/197424 A1 and which claims the priority of German Patent Application, Serial No. 10 2018 108 867.1, filed Apr. 13, 2018, pursuant to 35 U.S.C. 119 (a)-(d).

BACKGROUND OF THE INVENTION

The invention relates to a controller for a mobile drive. The invention also relates to a method for controlling a mobile drive by way of a speech input, wherein the mobile drive has the controller, to which at least one adjustment drive is connectable.

Document DE 43 15 210 C2 describes a method for controlling an adjustment unit of a furniture drive by way of a speech input. Speech inputs are detected and compared to comparison patterns in dependence on various operating modes, wherein depending on the operating mode, a selection decision is required between at most two permissible comparison patterns. The evaluation of the speech input, the speech analysis, is technically simplified by the reduction to only two alternatives in every operating mode. However, the operation of the furniture drive is complicated in that the speech input does not permit the use of natural communication patterns and structures.

The performance of computers and computer networks, which has grown enormously in recent years, has resulted in the meantime in the use of speech control in many areas of application. Not least, systems have become known in the meantime, for example, Google Assistant of Google Inc. or "Alexa Voice Service" of Amazon Europe Core S.á.r.l., which enable extensive speech inputs and outputs via provided interfaces (API—application programming interface), wherein speech inputs are sent via a network connection to an evaluation computer (server) located in a computer network (cloud), are processed therein and evaluated, for example, in the form of recognized text, and are sent back via the network to the sender of the query. A speech control for devices can be implemented in a relatively simple manner using this speech input evaluated externally (from the viewpoint of the application).

A use of such an external speech evaluation by the controller of a furniture drive permits a convenient speech input, which is also understood, for example, if the spoken speech does not follow a strictly predetermined syntax.

In furniture drives in general and especially in the field of care or hospitals, however, strict safety requirements are to be met. In the case of moving furniture parts, for example, there is a risk of pinching, which ensures rapid and reliable reaction of the controller to requests for an emergency shutdown. The required safety level is not achievable upon use of network-based services for speech recognition. For example, even a short-term network disturbance or delay in the transmission can have the result that a safety-relevant command is not recognized or is only recognized with such a delay that personal endangerment is not to be precluded.

It is therefore an object of the present invention to provide an improved controller having speech controller for a furniture drive, which can be brought easily into a safe state at any time even upon use of a speech controller. It is a further object to provide a method for controlling a furniture drive having the mentioned properties.

SUMMARY OF THE INVENTION

This object is achieved by a controller for a furniture drive and a method for controlling a furniture drive having the features of the respective independent claim. Advantageous designs and refinements are the subject matter of the respective dependent claims.

A controller according to the invention for a furniture drive, to which at least one adjustment drive is connectable, comprises a local speech analysis unit which is configured to carry out such a method. The advantages mentioned in conjunction with the method result.

A controller according to the invention for a furniture drive, to which at least one adjustment drive is connectable, wherein the controller has a speech controller and an operating device, is provided. The speech controller comprises at least one speech control subunit and at least one microphone. The speech control subunits enable a compact construction and an inexpensive design of the speech controller.

In one advantageous embodiment, it is provided that a separate microphone is associated with each speech control subunit. It is preferable here for the speech control subunits to each be arranged with the associated microphone in an operating unit of the operating device. An advantageously compact and simple structure thus results.

It is advantageous if three speech control subunits are each arranged in the operating unit, wherein two speech control subunits each form actuators of adjustment functions and one speech control subunit forms an actuator of stopping an associated adjustment drive. Button elements having contact wear are thus precluded, actuation by speech is simplified, since the operating unit can be held in the hand and thus environmental noises can interfere less.

To save components, it can be advantageous if two speech control subunits are each arranged in the operating unit, wherein the respective two speech control subunits form actuators of adjustment functions of an associated adjustment drive, and wherein one speech control subunit forms a shared actuator of stopping an associated adjustment drive.

A significant advantage is formed by a further embodiment, in which a further speech control subunit is arranged in the operating unit, wherein the further speech control subunit forms an EMERGENCY OFF actuator, since increased safety can thus be achieved.

In another embodiment, it is provided that a further speech control subunit is arranged in the operating unit, wherein the further speech control subunit is coupled to a light of the operating unit. The operating unit may thus advantageously be found easily in the dark when a specific keyword is spoken.

A further embodiment which particularly advantageously facilitates finding a misplaced operating unit, also in the dark, provides that a further speech control subunit is arranged in the operating unit, wherein the further speech control subunit is coupled to an acoustic indicator, which is arranged in the operating unit.

A further preferred embodiment is formed in that the speech control subunit comprises the microphone and a speech analysis device and forms a complete unit with them. In a further design, the speech control subunit can comprise the microphone, the speech analysis device, and a switching device and can form a complete unit with them.

A further embodiment of the speech control subunit has a microphone on the input side, while a plurality of different switching outputs or a data output for a plurality of different data is provided on the output side.

If switching outputs are provided, they thus have an electrical switching command or alternatively a set voltage output in dependence on the phrase(s) recognized by the speech control subunit or the word/words recognized by the speech control subunit. In this case, at least one phrase, for example, in the form of a word chain or at least one word is associated with the respective switching output. The logical signal or the electrical signal of each switching output is supplied for this purpose to a switching component in the form of a power transistor or a relay switch, the switching output of which is then arranged in the circuit of the respective electric motor of the respective adjustment drive for switching it on and off. It is also to be noted that the relay switches can each also have a driver transistor connected upstream.

If a data output is provided, similarly to the above description, the at least one phrase, for example, in the form of a word chain or the at least one word is thus similarly associated with a respective data set. The data set itself is supplied to a microcontroller, which then makes an association of the respective data set with a switching output connected to it or provided on it. The at least one switching output is thus set in dependence on the respective data set, wherein this output can conduct either a logical signal or an electrical signal. This signal is also supplied as described at the outset to a power transistor or a relay switch, the switching output of which is then arranged in the circuit of the respective electric motor of the respective adjustment drive for switching it on and off. This execution of the transmission of a data set in the transmission chain is particularly preferable for wireless transmission links from the operating unit or from a mobile device to the controller.

In a further embodiment, the operating unit having the speech control subunits can be connected and communicate via a cable with the controller and/or can communicate with the controller via a wireless transmission link. This results in great versatility of the design of the operating unit.

It is also conceivable that in addition to the speech control subunits, further sampling elements can be provided for operation.

The microphone, which is integrated into a speech control subunit together with a speech analysis device and forms a complete unit with it, results in the advantage that in particular for the control of the EMERGENCY OFF operating state, a speech control subunit can be used in a simple and compact construction with very minor space requirement inexpensively alone or also as a redundancy with particularly rapid reaction. This speech control unit can also be used for further purposes, for example, power saving mode, standby operation, control of a grid cut-off.

The controller can itself have one microphone or a plurality thereof integrated in a respective speech control subunit for converting the acoustic signals into electrical signals or provides a connection for a microphone, wherein electrical signals of the microphone can already be provided by an integrated speech analysis device in the respective speech control subunit on the basis of recognized keywords.

A method according to the invention which can be carried out using the controller mentioned at the outset comprises the following steps:
converting an acoustic signal into an electrical signal;
evaluating the electrical signal by way of at least one local speech analysis device; and
controlling an operating state of the furniture drive if a keyword from a set of keywords is recognized during the evaluation.

The electromotive furniture drive can have various operating states. The following operating states are possible, inter alia: OFF operating state, ON operating state, STANDBY operating state, EMERGENCY OFF operating state, GRID CUT-OFF operating state.

In the OFF operating state, a motor is/motors of the furniture drive are switched off, but can be switched into the ON operating state by an actuator. A power supply of the controller is provided.

In the ON operating state, a motor is/motors of the furniture drive are switched on, for example, by means of a manual operation. The power supply of the controller is provided.

In the STANDBY operating state, the power supply of the controller and possibly further transmission units, for example, radio gateway or the like, is reduced to a minimum. When the STANDBY operating state is switched on, it has to be switched off so that an actuation of the furniture drive becomes possible. This switching off of the STANDBY operating state is also referred to as "waking up".

In the EMERGENCY OFF operating state, it is not possible to switch on the motor/motors of the furniture drive. If the EMERGENCY OFF operating state is switched on from the on operating state, switched-on motor/motors is/are immediately switched off. The power supply of the controller is not provided. The EMERGENCY OFF operating state is ended after its cause is remedied by suitable measures, which are not described in greater detail here.

In the GRID CUT-OFF operating state, a connection of the furniture drive, i.e., the power supply, to a grid connection is interrupted by means of a grid cut-off device. The grid cut-off device recognizes in the switched-on GRID CUT-OFF operating state, when it is switched off, i.e., a connection to the grid is required for operating the furniture drive. The grid cut-off device also recognizes when the GRID CUT-OFF operating state can be resumed again.

A received acoustic signal is converted into an electrical signal and evaluated in a local speech analysis device. This speech analysis device is integrated with the microphone in a speech control subunit. If a keyword from a set of keywords is recognized during the evaluation, an operating state of the furniture drive is controlled, wherein this operating state is switched on or off in dependence on one keyword or a plurality thereof.

Thus, in the method step of controlling an EMERGENCY OFF operating state of the furniture drive, stopping of a movement of the at least one adjustment drive is carried out. The locally evaluated speech output is thus used for an emergency shutdown in the case of hazard. Calling out specific keywords such as "stop" "halt", or similar expressions or noises is a natural and very rapid reaction in case of hazard, whereby a safe and reliable emergency shutdown is enabled. The local evaluation offers a high reliability from failure.

In the method step in which the step of controlling a STANDBY operating state of the furniture drive comprises switching on and/or off a STANDBY operating state of a transmission unit and/or an interface device, the transmission unit and/or the interface device is switched into a power saving mode or "woken up" from it.

The method step of controlling a GRID CUT-OFF operating state of the furniture drive comprises switching on and/or off a grid cut-off circuit. A disconnection of the grid from the furniture drive can thus advantageously be carried out.

If a keyword from a set of keywords is recognized during the evaluation, a movement of the at least one adjustment drive is stopped. The locally evaluated speech input is thus used for an emergency shutdown in case of hazard. Calling out specific keywords such as "stop" "halt", or similar expressions or noises is a natural and very rapid reaction in case of hazard, whereby a safe and reliable emergency shutdown is enabled. The local evaluation offers a high reliability from failure.

In one advantageous design of the method, the set of the keywords is predetermined. It comprises, for example, fewer than 10 and in particular fewer than 6 keywords. It has been shown that in spite of all individuality of the user of the furniture or furniture drive, the expressions called out in case of hazard may be reduced to the mentioned small number of keywords. This simplifies the local evaluation, which can accordingly be implemented with little hardware expenditure and/or low processing power.

To alleviate a pinching situation which is possibly already occurred, in a further advantageous design of the method, it is provided that a movement of the at least one adjustment drive is at least temporarily to be reversed after stopping.

For the "regular" control of the furniture drive, in a further advantageous design of the method, the controller is configured for the wired or wireless reception of control commands for the at least one adjustment drive from an operating device. A special handheld operating unit and/or a mobile device configured as such, for example, a smart phone or a tablet, can thus be used to set various positions of the furniture.

BRIEF DESCRIPTION OF THE DRAWING

The invention will be explained in greater detail hereinafter on the basis of exemplary embodiments. In the figures:

FIG. 5 shows a schematic block diagram of a variant of the exemplary embodiment of the speech-controlled controller for the furniture drive according to FIGS. 1, 2.

DETAILED DESCRIPTION OF PREFERRED EMBODIMENTS

Figure 1:
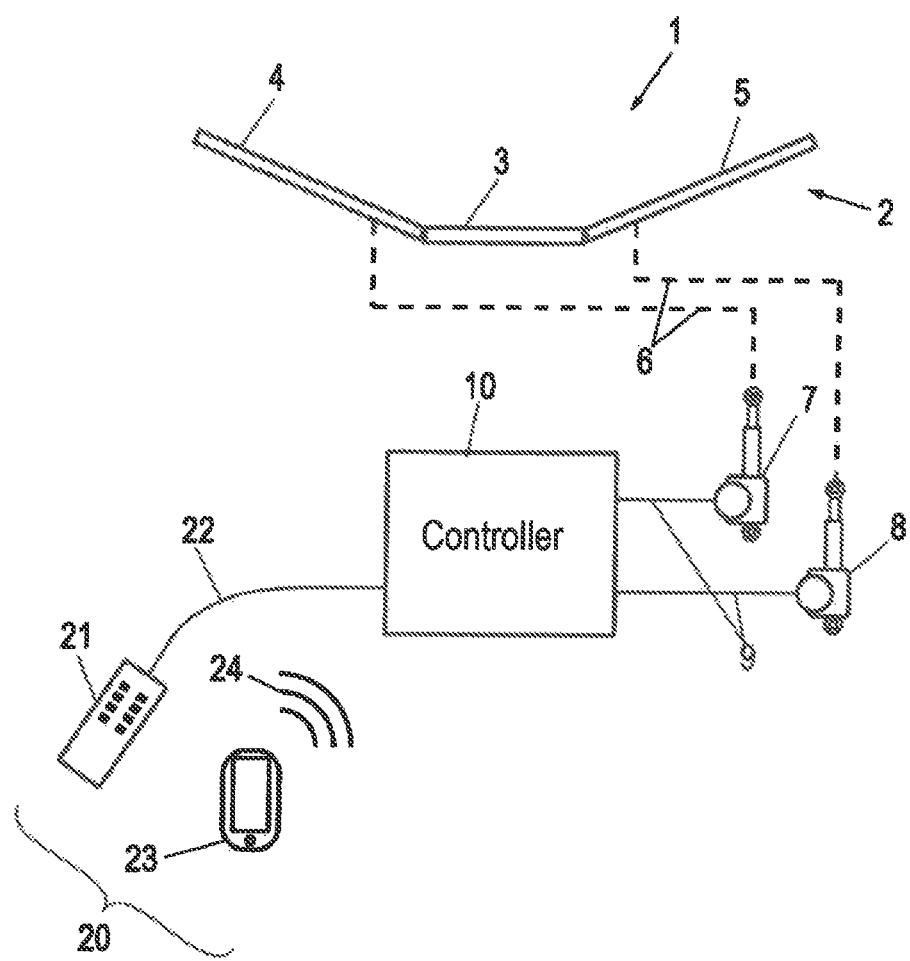
FIG. 1 shows a schematic illustration of a bed having a furniture drive in an exemplary embodiment of a speech-controlled controller.
Figure 2:
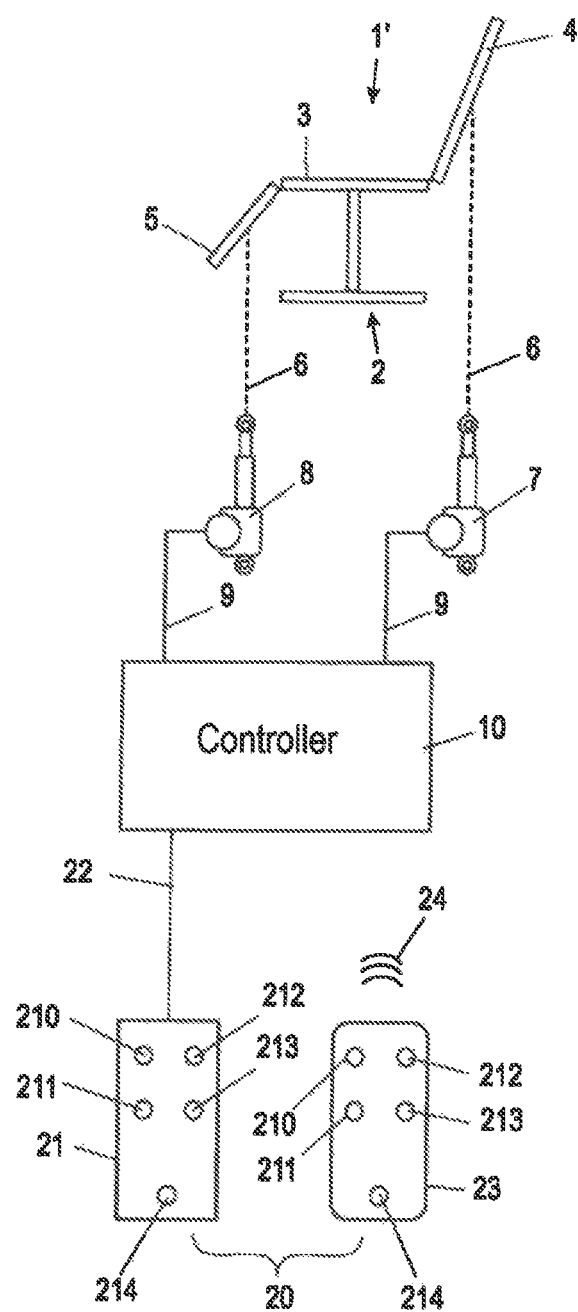
FIG. 2 shows a schematic illustration of an item of seating furniture having a furniture drive and the exemplary embodiment of the speech-controlled controller.
Figure 3:
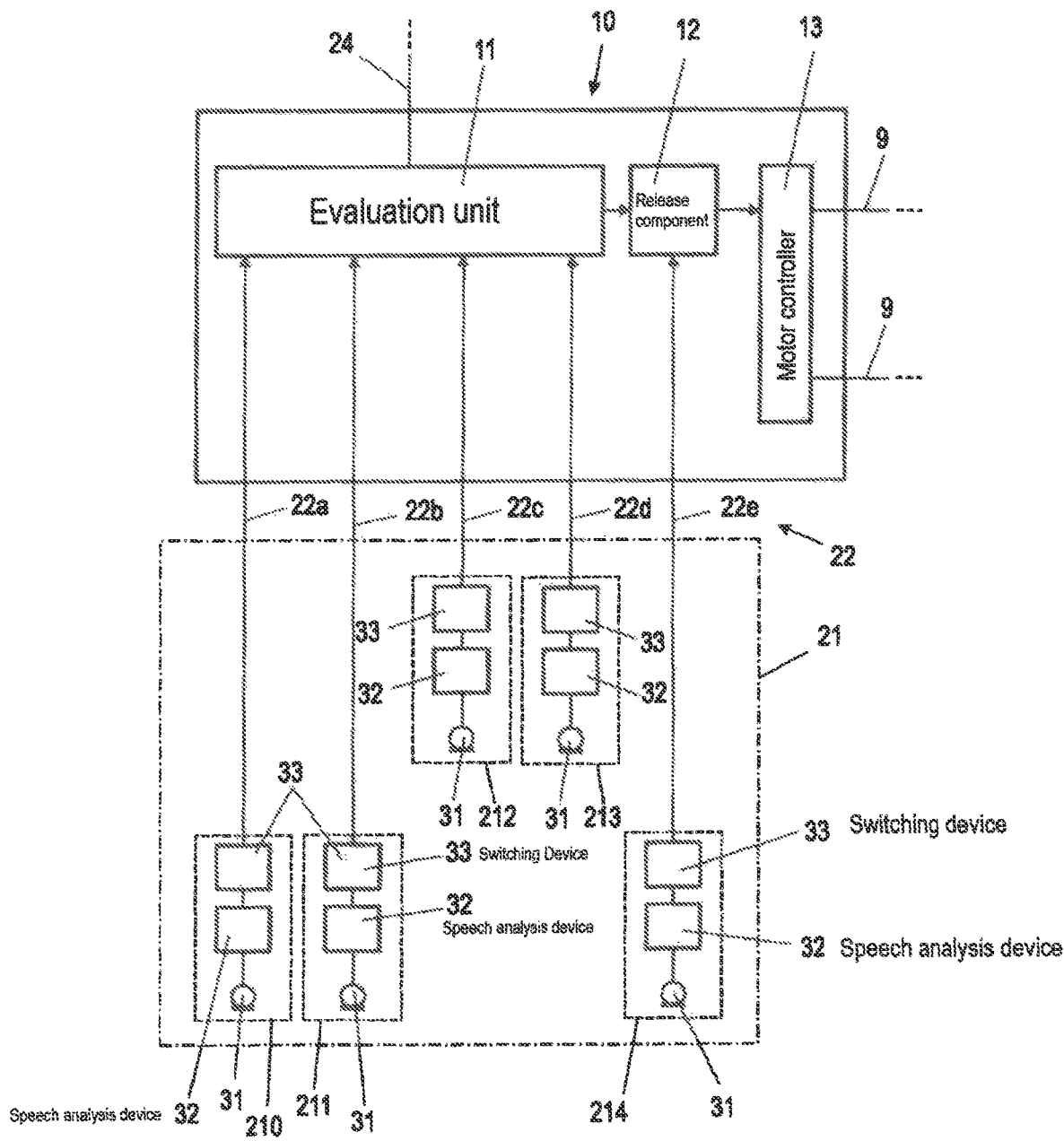
FIG. 3 shows a schematic block diagram of the speech-controlled controller for the furniture drive according to FIGS. 1, 2.

FIG. 1 shows a bed 1 as an example of an item of furniture having an electromotive furniture drive in an exemplary embodiment of a speech-controlled controller 10 in a schematic view. FIG. 2 is a schematic illustration of an item of seating furniture 1' having a furniture drive and the exemplary embodiment of the speech-controlled controller 10. A schematic block diagram of the speech-controlled controller for the furniture drive according to FIGS. 1, 2 is shown in FIG. 3.

The bed 1 has at least one support element 2 for accommodating a mattress (not shown here). The bed 1 can be designed as a single bed for one person or also as a double bed for multiple persons. The support element 2 is formed from multiple plate-shaped parts or from a slatted frame and is placed or installed on a base element (not shown here), for example, a framework having feet.

The support element 2 has in the illustrated example a back part 4 and a leg part 5, which are arranged movably mounted in relation to a fixed middle part 3 or in relation to the base element. This movable arrangement is implemented, for example, by means of a so-called movement fitting (not shown here). The movement is designed as displaceable and/or pivotable.

The bed 1 shown in this example is equipped with an electromotive furniture drive. The movably mounted back part 4 and the leg part 5 are each coupled here to an electromotive adjustment drive 7, 8 via a mechanical connection 6 (only schematically shown). The back part 4 is thus coupled to the electromotive adjustment drive 7. The electromotive adjustment drive 8 is provided for moving or adjusting the leg part 5.

The item of seating furniture 1' shown in FIG. 2 has a support element 2. The support element 2 is provided with a base plate to be placed on an underlying surface and is connected to a middle part at its upper end using a movement fitting (not shown). A back part 4 as a backrest and a leg part 5 are pivotably attached to the middle part. The back part 4 is coupled to the adjustment drive 7, and the leg part 5 is connected to the adjustment drive 8. The connections 6 are embodied here similarly as described above.

The electromotive adjustment drives 7, 8 are designed in the present case as linear drives. The linear drives have one or a number of electric motors, wherein a speed reducing gear having at least one gear step is generally connected downstream of each motor. A further gear, for example, in the form of a threaded spindle gear, can be connected downstream from the speed reducing gear, which generates a linear movement of an output element from the rotational movement of the motor. The last gear element or a further element connected thereto forms the output element. The output element of the respective electromotive adjustment drive is connected to the respective furniture component (back part 4, leg part 5) or alternatively to a component connected to the base element, so that upon operation of the electric motor of the respective adjustment drive 7, 8, the movable furniture components 4, 5 are adjusted in relation to one another and/or in relation to the base element.

The electromotive adjustment drives 7, 8 are electrically connected to a controller 10 for the control thereof. This connection can be embodied, for example, as a pluggable wired connection 9. The controller 10 has an electrical supply unit 100 (see FIG. 5), which provides the electric energy, for example, from a power supply grid, for the electromotive adjustment drives 7, 8. For this purpose, the controller 10 is connectable via a grid cable 101 to a grid plug 102 having a grid connection (see FIG. 5). The grid plug 102 conducts the input-side grid voltage via the grid cable 101 to the electrical supply unit 100 of the controller 10, which outputs a low voltage in the form of a DC voltage on the secondary side.

Alternatively thereto, the controller 10 has an external grid-dependent power supply 100 having grid input/grid plug 102 and having secondary-side low voltage output connected upstream, which supplies the low voltage in the form of a DC voltage via the line.

The electrical supply of the furniture drive of the item of seating furniture 1' can also be implemented by means of a rechargeable accumulator, which is not shown here, but is easily conceivable. Such an accumulator can be arranged both in the furniture drive or externally and can have an integrated or external charging device.

In an alternative design, the controller 10 is not arranged or is not arranged completely in a separate housing, but rather is integrated entirely or partially into one of the adjustment drives 7, 8. This adjustment drive then represents a main drive, to which possibly further adjustment drives can be connected.

The electromotive furniture drive can have various operating states. The following operating states are possible, inter alia: OFF operating state, ON operating state, STANDBY operating state, EMERGENCY OFF operating state, GRID CUT-OFF operating state.

In the OFF operating state, a motor is/motors of the furniture drive are switched off, but can be switched into the ON operating state by an operating device 20. A power supply of the controller 10 is provided.

In the ON operating state, a motor is/motors of the furniture drive are switched on, for example, by means of the operating device 20. The power supply of the controller 10 is provided.

In the STANDBY operating state, the power supply of the controller 10 and possibly further transmission units, for example, radio gateway or the like, is reduced to a minimum. When the STANDBY operating state is switched on, it has to be switched off so that an actuation of the furniture drive becomes possible. This switching off of the STANDBY operating state is also referred to as "waking up".

In the EMERGENCY OFF operating state, it is not possible to switch on the motor/motors of the furniture drive. If the EMERGENCY OFF operating state is switched on from the on operating state, switched-on motor/motors is/are immediately switched off. The power supply of the controller 10 is provided. The EMERGENCY OFF operating state is ended after its cause is remedied by suitable measures, which are not described in greater detail here.

In the GRID CUT-OFF operating state, a connection of the furniture drive, i.e., the power supply, to a grid connection is interrupted by means of a grid cut-off device. The grid cut-off device recognizes in the switched-on GRID CUT-OFF operating state when it is switched off, i.e., a connection to the grid is required for operating the furniture drive. The grid cut-off device also recognizes when the GRID CUT-OFF operating state can be resumed again.

Two alternative options for an operating device 20 for the furniture drive are shown in FIGS. 1 and 2. In one design, a wired operating unit 21 can be provided, which has operating elements, for example, in the form of buttons.

In the exemplary embodiment shown here, the furniture drive has a controller 10 having a speech controller. Instead of the typical actuating buttons, speech control subunits 210 to 214 each having a microphone 31 (see, for example, FIGS. 3, 4) are provided in the operating unit 21. A respective adjustment function of the respective associated adjustment drive 7, 8 is associated here with each of the speech control subunits 210 to 214. This is explained in greater detail below.

The operating unit 21 can also be wirelessly connected in an alternative design, wherein it has a transmitting device for a wireless transmission of signals to the controller 10. An actuation of the speech control subunits 210 to 214 by means of speech, which is explained in detail below, generates control signals, which are transmitted via the illustrated connecting cable 22 to the controller 10, which controls the adjustment drives 7, 8 in accordance with the operated elements. This control can be subject to certain restrictions, for example, certain adjustment drives 7, 8 or certain adjustment ranges can be excluded from an adjustment or can only be accessible after release, for example, via a key switch or similar superior element. Moreover, one or more end switches can be arranged in each of the adjustment drives 7, 8, which prevent a movement beyond one or two defined endpoints.

The operating unit 21 can be connected, as shown in FIGS. 1 and 2, via the connecting cable 22 to the controller 10. Alternatively, the operating unit 21 can be provided with a transmitting device for a wireless transmission of signals to the controller 10. The wireless transmission can be implemented by a radio transmission link, an optical transmission link (for example, for infrared light), and/or an ultrasonic transmission link, wherein the controller 10 is equipped with a respective corresponding receiving unit. For example, such a receiving unit is schematically illustrated as a transmission unit 110 for the transmission link 24 in FIG. 5.

The operating device 20 can also be produced by a mobile device 23 alternatively or additionally to the operating unit 21. The mobile device 23 can be in particular a commercially available mobile telephone ("smart phone") or a tablet computer. An item of software ("app") is preferably installed on the mobile device 23 for the function as an operating unit. Control commands to the adjustment drives 7, 8 can thus be transmitted via a wireless transmission link 24 from the mobile device 23 used as a handheld control to the controller 10. The wireless transmission link 24 can be based, for example, on a WLAN (wireless local area network) or Bluetooth transmission path. The wireless transmission from the mobile device 21 via the wireless transmission link 24 can take place directly to the controller 10. In alternative designs, a transmission is also possible via an access point (not shown here) of a network, to which the controller 10 is connected.

The operating device 20 is implemented in the exemplary embodiment of FIGS. 1 and 2 as a speech controller, which comprises speech control subunits 210 to 214 each having a microphone 31 in the exemplary embodiment. Each of the speech control subunits 210 to 214 is connected to the control unit 10 via a respective cable 22a, 22b, 22c, 22d, 22e, as shown in FIG. 3. A control of the adjustment drives 7, 8 and possibly further components of the furniture drive connected to the controller 10 and controlled by the controller 10 takes place via electrical signals of the microphone 31, which reproduce the acoustic signals received by the respective microphone 31.

This is described in greater detail on the basis of the example of the item of seating furniture 1' in FIG. 2.

Two speech control subunits 210 and 211 are associated with the adjustment drive 7 for adjusting the back part 4 in a pivot movement upward and a pivot movement downward. In the same manner, the further two speech control subunits 212 and 213 are associated with the adjustment drive 8 for adjusting the leg part 5 in a pivot movement upward and a pivot movement downward. Stopping of every adjustment movement of the adjustment drives 7, 8 is performed in this example by the speech control subunit 214.

Each speech control subunit 210 to 214 comprises the microphone 31, a speech analysis device 32, and a switching device 33.

The speech control subunit 210, 211, 212, 213, 214 is a very small, completely integrated component. With its speech recognition, which is performed by means of the speech analysis device 32 of the words recorded by the microphone 31, the speech control subunit 210, 211, 212, 213, 214 is capable of recognizing individual words or phrases. The speech control subunit 210, 211, 212, 213, 214 can be designed, for example, only for special words and thus can be particularly fast.

An electrical signal for control can be output in dependence on recognized words or phrases by means of the switching device 33. This switching device 33 can be integrated (as shown) into the speech control subunit 210, 211, 212, 213, 214 or can also be arranged externally. It is designed, for example, as a semiconductor switch and/or an electromechanical contact (relay).

The operating unit 21 can be picked up in the hand or arranged in speech range of an actuator. Certain keywords are then spoken to actuate the adjustment drives 7, 8. This will be explained hereinafter.

The controller 10 of the exemplary embodiment according to FIGS. 1 and 2 is shown in greater detail in the form of a block diagram in FIG. 3. In this block diagram, a power supply for the controller 10 and/or the adjustment drives 7, 8 is not shown. It is either integrated in the form of a power supply unit into the control device 10, which then also has a grid connection in addition to the connections shown. For example, a supply unit 100 is indicated hereinafter in conjunction with FIG. 5 in this regard. Alternatively, an external power supply unit can also be provided, which supplies the controller 10 with a low voltage.

The controller 10 comprises an evaluation unit 11, which in the illustrated example evaluates signals of the operating unit 21 which are supplied via the cable 22. Furthermore, the evaluation unit 11 is configured for evaluating supplied control commands of the mobile device 23 via the transmission link 24 using a transmitting unit 110 (see FIG. 5). If the controller 10 permits this control option, a receiver for signals of the transmission link 24 can be arranged in the evaluation unit 11 or connected to the evaluation unit 11, for example, a Bluetooth receiver. A transmitting unit 110 is schematically shown as an example of such a receiver in FIG. 5. Alternatively, items of information of the mobile device 23 for controlling the adjustment drives 7, 8 can also be transmitted via a network (not shown) and a network connection to the evaluation unit 11 and analyzed therein.

In general, the evaluation unit 11 has a microcontroller, which evaluates the received control commands for the adjustment drives 7, 8. This microcontroller can also be used for further tasks.

The evaluation unit 11 is connected in the illustrated example via a release component 12 to a motor controller 13. The motor controller 13 accepts instructions which relate to an adjustment of the adjustment drives 7, 8 and converts them into corresponding motor currents for operating the adjustment drives 7, 8. The motor controller 13 can be viewed in these terms as a power end stage of the controller 10.

It is to be noted that in alternative designs, adjustment drives can also be used which contain the motor controller itself in integrated form. In this case, a corresponding motor controller 13 is dispensed with in the controller 10. The function of the release component 12 is explained hereinafter.

The microphones 31 are each part of a speech control subunit 210, 211, 212, 213, 214 of the controller 10. The speech control subunits 210, 211, 212, 213, 214 are coupled via the individual cables or cable wires 22a, 22b, 22c, 22d to the evaluation unit 11. The speech control subunit 214 is connected here via the cable 22e to the release component 12 (FIG. 3).

In operation of the controller 10, electrical signals of the microphones 31 are digitized in the speech control subunits 210, 211, 212, 213, 214 and analyzed by the respective speech analysis device 32 of a respective speech control subunit 210, 211, 212, 213, 214, wherein a speech content is extracted. This is performed, for example, in comparison to previously stored or defined speech patterns, the number of which can be limited.

If the spoken control word or keyword is recognized during this comparison, the switching device 33 is thus prompted to emit an electrical signal, for example, a specific voltage.

This signal is transmitted to the evaluation unit 11 via the cable 22. The evaluation unit 11 then controls the motor controller 13, presuming that the release component 12 is not blocked (for example, by a preceding EMERGENCY OFF signal, as described below in conjunction with FIG. 5).

The speech control subunits 210, 211, 212, 213, 214 react to spoken keywords, for which they are preset. This task does not require a high level of processing power or a complex speech analysis system.

Typical spoken commands can have the form "back up" or "leg down" or "stop" or the like. Commands of the form "memory" are also conceivable upon use of a memory function of the controller 10. Furthermore, factory-preset commands such as "move into the TV position" or "move into zero gravity" or "move into the recumbent position" can also be provided, which are linked to permanently preset adjustment positions for the head part and/or the foot part. The above-mentioned commands are solely exemplary in nature and can be adapted as desired to the functional options of the bed 1 or the item of seating furniture 1' having the furniture drive.

In this exemplary embodiment, the keywords "stop", "halt", "freeze", "off", and the like are only recognized by the one speech control subunit 214, because the release component 12 is thus prompted to immediately switch off any adjustment movement of the adjustment drives 7, 8.

Of course, it is also possible that each adjustment drive 7, 8 is respectively associated with three speech control subunits 210, 211, 214 and 212, 213, 214, in such a way that one speech control subunit 214 for a stop function is associated with each adjustment drive 7, 8. Furthermore, a further speech control subunit 214 can also be provided as a redundant EMERGENCY OFF actuator. This is not shown but is easily conceivable.

For example, a further speech control subunit 217 can be provided as an EMERGENCY OFF actuation. An EMERGENCY OFF operating state can be activated, for example, in that the further speech control subunit 217 directly recognizes instructions such as "stop" or "halt" and relays an emergency stop signal to a further release component 12a. It thereupon blocks a signal possibly received from the evaluation unit 11 in the release component 12 to operate one of the adjustment drives 7, 8 and thus blocks a further movement of the adjustment drives 7, 8. The blocking function of further speech control subunit 217 can, of course, also act on the evaluation unit 11 and be taken into consideration therein or act directly on the motor controller 13 and result in blocking of the adjustment drives 7, 8 therein. In this manner, the emergency off operating state of the furniture drive is controlled.

The speech control by the speech control subunits 210, 211, 212, 213, 214 is not only convenient, it is also safe, since the commands can be overridden at any time by the emergency stop shut down by the speech control subunit 214 and possibly by the further speech control unit 217.

In alternative designs, it is conceivable that the adjustment drives 7, 8 not only stop when a corresponding emergency stop command occurs, but rather stop and move at least somewhat in an opposing direction. In this way, a person in bed 1 negatively affected by the adjustment procedure can be moved back into a pleasant position or a slight pinching which has already occurred can be reversed.

The speech control subunits 210, 211, 212, 213, 214, 217 can operate a further microcontroller, a DSP (digital signal processor), and/or an FPGA (field programmable gate array) in this case, wherein the mentioned components are possibly integrated in the form of a SOC (system-on-a-chip). With relatively little hardware expenditure, in this manner at least one analysis of speech inputs restricted to a few keywords can take place. The mentioned keyword "stop", for example, is easily and reliably identifiable on the basis of the characteristic phonetics. In addition to explicit words, noises used in conjunction with hazardous situations can also be recognized and can be interpreted as signs to stop the adjustment drives 7, 8 or cause them to run in reverse. A further increased safety level is thus achieved.

It is to be noted that the illustrated speech-based emergency shutdown for the adjustment drives 7, 8 based on the local speech control subunit 214 and possibly the further speech control unit 217 can be combined with further safety measures to ensure a comprehensive pinch protection. In these terms, pressure sensors or button sensors, which are arranged on the moved bed elements or a framework of the bed 1 item of seating furniture 1' or another item of adjustable furniture (for example, lift table) can also be evaluated and act on the release component 12 and thus the motor controller 13.

If the controller 10 has been deactivated by means of the emergency shutoff, the furniture drive is in the EMERGENCY OFF operating state.

Figure 4:
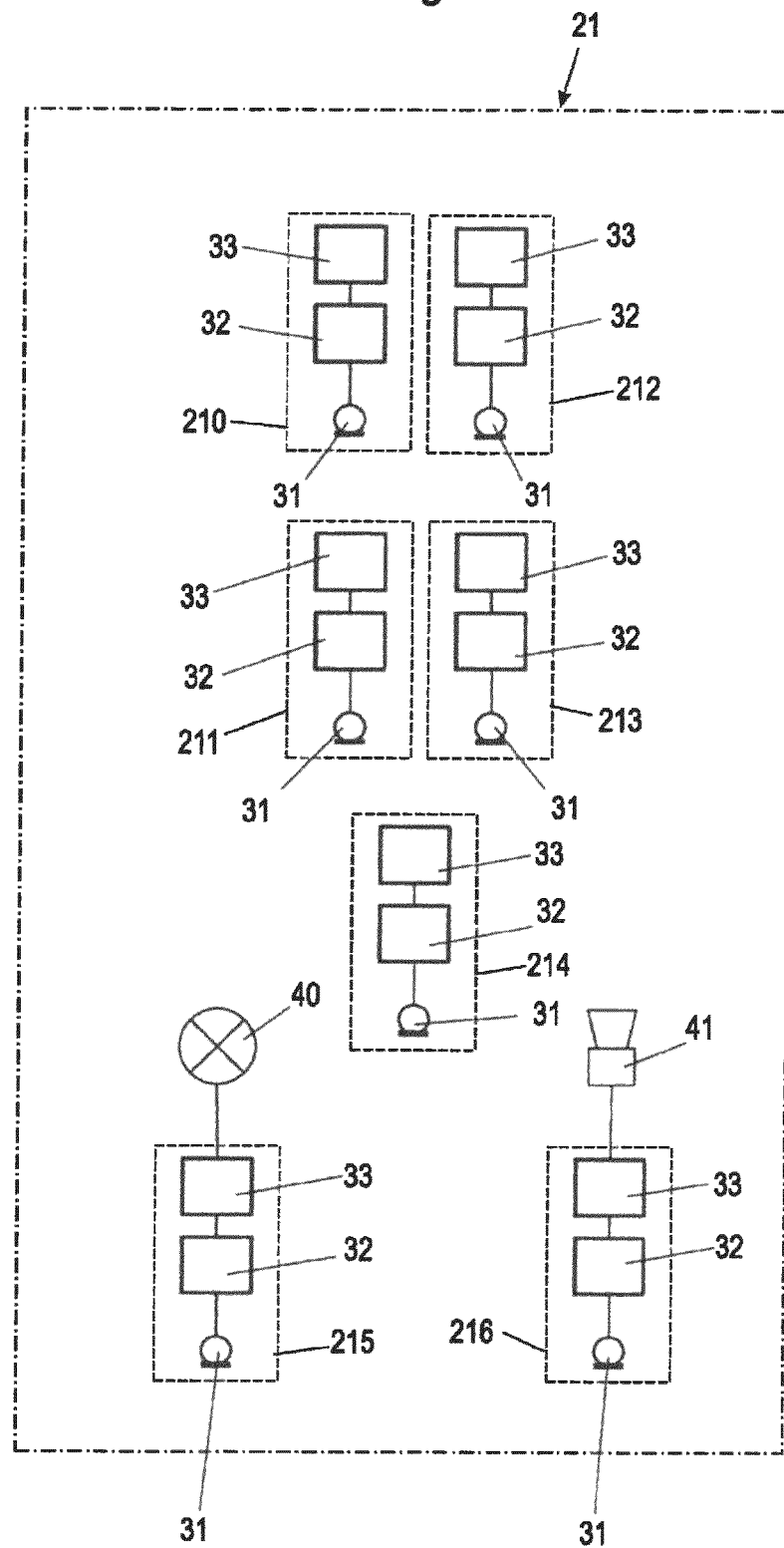
FIG. 4 shows a schematic block diagram of an operating unit.

FIG. 4 shows a schematic block diagram of an operating unit 21. As already described above, the typical actuating elements are replaced by the speech control subunits 210, 211, 212, 213, 214. The example shown here relates to an item of furniture having two adjustment drives 7, 8. Of course, embodiments having more than two adjustment drives 7, 8 or having only one are also possible.

The operating unit 21 shown in FIG. 4 is equipped here with two further speech control subunits 215 and 216. The speech control subunit 215 is connected to a light 40 of the operating unit 21 and switches it on upon a certain keyword, for example, "light". This is helpful in particular in the dark. Easily finding the operating unit 21, in particular if it is wireless, can be enabled by the further speech control subunit 216, which is connected to an acoustic indicator 41. The further speech control subunit 216 can react, for example, to the keyword "search" or "report".

FIG. 5 shows a schematic block diagram of a variant of the exemplary embodiment of the speech-controlled controller 10 for the furniture drive according to FIGS. 1, 2.

An exemplary use of three further speech control subunits 217, 218, 219 will be shown in addition to the speech control subunits 210 to 216 of the operating unit 21.

The first speech control subunit 217 is connected here as already indicated above to an emergency off release unit 12a, which is connected to the release unit 12 and to the motor controller 13. The speech control subunit 217 directly recognizes, like the speech control subunit 214 in the operating unit 21, Instructions such as "stop" or "halt" and relays an emergency stop signal to the release component 12a.

The speech control subunit 217 as an EMERGENCY OFF actuator can also be connected at another point, however. It is thus possible, for example, that the speech control subunit 217 can be formed solely or additionally as an external component for a bus arrangement (MFP/Furnibus). Furthermore, it is conceivable that the speech control subunit 217 is solely or additionally installed in a Wi-Fi radio gateway or looped into the supply line to the motors.

The second speech control subunit 218 is connected here to a transmitting unit 110 in the evaluation unit 11. The transmitting unit 110 is connected to the transmission link 24 and can be, for example, a transceiver for a wireless transmission link 24, for example, infrared, ultrasound, radio. The second speech control unit 218 recognizes instructions such as "standby ON/OFF", "power save ON/OFF", and the like. The second speech control unit 218 thus controls the STANDBY operating state in that the transmitting unit 110 is switched into a power-saving mode when a keyword such as "standby ON", inter alia, is recognized. The power saving mode is switched off again when the second speech control subunit 218 recognizes a keyword such as "standby OFF" or any other keyword for "waking up".

In FIG. 5, the supply unit 100 within the control unit 10 is furthermore shown and is connected via a grid cable 101 having a grid plug 102 for connection to a network. In addition, the grid plug 102 is arranged here together with a grid cut-off circuit 103 in a housing as a plug-in power supply unit. The grid cut-off circuit 103 is connected in this variant to a third speech control subunit 219.

By means of the grid cut-off circuit 103, the furniture drive can be separated completely or also only partially from an electrical power grid or also from a battery/accumulator supply. The grid cut-off circuit 103 recognizes by means of different devices (not described here) when the GRID CUT-OFF operating state is to be switched over, i.e., switched on or switched off. In the variant shown here, this is recognized by the third speech control subunit 219 by a keyword such as "cut off ON", "grid OFF", and/or "cut off OFF", "grid ON" and the like. In dependence on the recognized keyword, the third speech control subunit 219 then controls the GRID CUT-OFF operating state via the grid cut-off circuit 103.

In particular in the case of items of seating furniture 1', which are operated using accumulators, it is of great importance that a STANDBY operating state, of the power supply here, can be activated to reduce electric power which is taken from the accumulator to a minimum.

The controller 10 of the furniture drive is arranged together with it in most cases under the bed. It is therefore necessary for the microphones 31 of the speech control subunits 210, 211, 212, 213, 214, 215, 216, 217, 218, 219 to be placed at a point at which they are not sound-insulated by the bed 1 item of seating furniture 1', parts of the bed 1 item of seating furniture 1', or other objects. For this reason, the microphones 31 or the speech control subunits 210, 211, 212, 213, 214, 215, 216, 217, 218, 219 can be arranged outside the furniture, for example, on a nightstand or at a non-sound-insulated point, and can be connected via a cable connection or also wirelessly to the controller 10.

A power supply of the microphones 31 the speech control subunits 210, 211, 212, 213, 214, 215, 216, 217, 218, 219 can be produced via batteries, accumulators, or also small power supply units. Plug-in power supply units can also be used here, into which the microphones 31 or the speech control subunits 210, 211, 212, 213, 214, 215, 216, 217, 218, 219 are integrated.

Furthermore, it is possible that a so-called dead man switch is provided together with the microphones 31 or speech control subunits 210, 211, 212, 213, 214, 215, 216, 217, 218, 219 placed in the above-described manner. In this case, very short data sets are exchanged between the microphones 31 or speech control subunits 210, 211, 212, 213, 214, 215, 216, 217, 218, 219 and the controller 10, in particular by means of bidirectional transmission. The controller 10 is designed in this case so that it switches on the EMERGENCY OFF operating state if the microphone 31 in the or one specific one of the speech control subunits 210, 211, 212, 213, 214, 215, 216, 217, 218, 219 has lost the contact to the controller 10 within a definable time interval, for example, 1 to 2 seconds.

A deactivation or switching off of the EMERGENCY OFF operating state can be executed, for example, by means of an app or in another suitable manner.

What is claimed is:

1. A handheld operating unit for controlling an operating state of a furniture drive by speech input, said handheld operating unit comprising:
   a plurality of speech control subunits arranged in the handheld operating unit, each of the plurality of speech control subunits forming a complete unit including a microphone associated with a speech analysis device and a switching device;
   wherein each microphone converts an acoustic signal into an electrical signal;
   each speech analysis device evaluating the electrical signal from its associated microphone, and extracts speech content by comparison to different stored or predefined speech patterns; and
   each switching device controlling the operating state of the furniture drive when at least one keyword from a set of keywords is recognized by its associated speech analysis device as each electrical signal is evaluated in dependence on the at least one keyword so that each speech control subunit reacts to different spoken words for which each speech control subunit is preset.

2. The handheld operating unit of claim 1, wherein one of the speech control subunits forms an EMERGENCY OFF actuator.

3. The handheld operating unit of claim 1, wherein includes two sets of two of said speech control subunits arranged in the handheld operating unit and forming actuators of adjustment functions of two adjustment drives of the furniture drive, and one speech control subunit forming a shared actuator for stopping the adjustment drives.

4. The handheld operating unit of claim 3, wherein the one speech control subunit forms an EMERGENCY OFF actuator.

5. The handheld operating unit of claim 1, further comprising a light, said speech handheld operating unit including a further speech control subunit arranged in the handheld operating unit and coupled to the light.

6. The handheld operating unit of claim 1, further comprising an acoustic indicator arranged in the handheld operating unit, said handheld operating unit including a further speech control subunit arranged in the operating unit and coupled to the acoustic indicator.

7. The handheld operating unit of claim 1, wherein the handheld operating unit includes multiple switching outputs, which are switched in dependence on different recognized words or phrases.

8. The handheld operating unit of claim 1, further comprising a cable connecting the plurality of speech control units with a controller for communication, and/or a wireless transmission link for communication of the plurality of speech control units with the controller.

9. The handheld operating unit of claim 1, further comprising a further speech control subunit controlling an EMERGENCY OFF operating state of the furniture drive stopping of a movement of the adjustment drive of the furniture drive, wherein the further speech control subunit is external to the handheld operating unit.

10. The handheld operating unit of claim 1, further comprising a further speech control subunit controlling a STANDBY operating state of the furniture drive and includes a control of a transmitting unit and/or an Interface device by switching on and/or off the STANDBY operating state of the transmitting unit and/or the interface device, wherein the further speech control subunit is external to the handheld operating unit.

11. The handheld operating unit of claim 1, further comprising a further speech control subunit controlling a GRID CUTOFF operating state of the furniture drive and includes a switching on and/or off of a grid cut-off circuit, wherein the further speech control subunit is external to the handheld operating unit.

12. A method for controlling an operating state of a furniture drive by a speech input, said method comprising:
   receiving an acoustic signal with a plurality of local speech control subunits arranged in a handheld operating unit, wherein each speech control subunit forms a complete unit including a microphone associated with a speech analysis device and a switching device;
   with each speech control subunit, converting the acoustic signal into an electrical signal with the microphone;
   with each speech control subunit, evaluating the electrical signal from its associated microphone by the speech analysis device and extracting speech content by comparison to different stored or predefined speech patterns; and
   with each speech control subunit, controlling an operating state of the furniture drive with the switching device when at least one keyword from a set of keywords is recognized by its associated speech analysis device as each electrical signal is evaluated in dependence on the at least one keyword so that each speech control subunit reacts to different spoken words for which each is preset.

13. The method of claim 12, wherein a further speech control subunit external to the handheld operating unit controls an EMERGENCY OFF operating state of the furniture drive and includes a stopping of a movement of an adjustment drive of the furniture drive.

14. The method of claim 13, further comprising at least briefly reversing the movement of the adjustment drive after stopping.

15. The method of claim 12, wherein a further speech control subunit external to the handheld operating unit controls a STANDBY operating state of the furniture drive and includes a control of a transmitting unit and/or an interface device by switching on and/or off the STANDBY operating state of the transmitting unit and/or the interface device.

16. The method of claim 12, wherein a further speech control subunit external to the handheld operating unit controls a GRID CUTOFF operating state of the furniture drive and includes a switching on and/or off of a grid cut-off circuit.

17. The method of claim 12, wherein the set of the keywords is predetermined.

18. The method of claim 12, wherein the set of the keywords comprises fewer than 10 keywords.

19. The method of claim 12, wherein the set of the keywords comprises fewer than 6 keywords.

* * * * *